US009559395B2

(12) United States Patent
Christensen et al.

(10) Patent No.: US 9,559,395 B2
(45) Date of Patent: Jan. 31, 2017

(54) LITHIUM/AIR BATTERY WITH VARIABLE VOLUME INSERTION MATERIAL

(75) Inventors: John F. Christensen, Mountain View, CA (US); Paul Albertus, Mountain View, CA (US); Boris Kozinsky, Waban, MA (US)

(73) Assignee: Robert Bosch GmbH, Stuttgart (DE)

(*) Notice: Subject to any disclaimer, the term of this patent is extended or adjusted under 35 U.S.C. 154(b) by 1066 days.

(21) Appl. No.: 13/157,859

(22) Filed: Jun. 10, 2011

(65) Prior Publication Data

US 2012/0315554 A1    Dec. 13, 2012

(51) Int. Cl.
| | |
|---|---|
| *H01M 4/13* | (2010.01) |
| *H01M 12/06* | (2006.01) |
| *H01M 2/16* | (2006.01) |
| *H01M 4/38* | (2006.01) |
| *H01M 4/505* | (2010.01) |
| *H01M 4/86* | (2006.01) |

(52) U.S. Cl.
CPC .......... *H01M 12/06* (2013.01); *H01M 2/1673* (2013.01); *H01M 4/382* (2013.01); *H01M 4/505* (2013.01); *H01M 4/8652* (2013.01); *H01M 2300/0037* (2013.01); *Y02E 60/122* (2013.01); *Y02E 60/50* (2013.01)

(58) Field of Classification Search
CPC ..................... H01M 12/06; H01M 2300/0037; H01M 2/1673; H01M 4/382; H01M 4/505; H01M 4/8652; Y02E 60/122; Y02E 60/50
USPC ................. 429/321, 322, 324, 231.9, 231.95
See application file for complete search history.

(56) References Cited

U.S. PATENT DOCUMENTS

| | | | |
|---|---|---|---|
| 5,629,112 A | 5/1997 | Davidson et al. | |
| 6,844,113 B2 | 1/2005 | Yagi et al. | |
| 7,147,967 B1 | 12/2006 | Read | |
| 2007/0259234 A1 | 11/2007 | Chua et al. | |
| 2010/0104943 A1 | 4/2010 | Thomas et al. | |
| 2010/0119956 A1 | 5/2010 | Tokuda et al. | |
| 2010/0203397 A1 | 8/2010 | Thiemann-Handler et al. | |
| 2010/0227220 A1 | 9/2010 | Thackeray et al. | |
| 2010/0266907 A1 | 10/2010 | Yazami | |
| 2011/0059355 A1 | 3/2011 | Zhang et al. | |

(Continued)

FOREIGN PATENT DOCUMENTS

EP    2144321 A1    1/2010

OTHER PUBLICATIONS

International Search Report and Written Opinion in corresponding PCT Application (i.e., PCT/US2012/041368), completed Aug. 31, 2012 (10 pages).

(Continued)

*Primary Examiner* — Patrick Ryan
*Assistant Examiner* — Ben Lewis
(74) *Attorney, Agent, or Firm* — Maginot, Moore & Beck LLP

(57) ABSTRACT

In accordance with one embodiment, an electrochemical cell includes a negative electrode including a form of lithium, a positive electrode spaced apart from the negative electrode and including an electron conducting matrix and a lithium insertion material which exhibits a volume change when lithium is inserted, a separator positioned between the negative electrode and the positive electrode; and an electrolyte including a salt, wherein $Li_2O_2$ or $Li_2O$ is formed as a discharge product.

7 Claims, 4 Drawing Sheets

(56) References Cited

U.S. PATENT DOCUMENTS

2011/0250506 A1* 10/2011 Koshina .................. 429/338
2011/0311882 A1* 12/2011 Kim et al. ................ 429/320
2012/0100440 A1*  4/2012 Narula et al. ............. 429/405

OTHER PUBLICATIONS

Abraham et al., "A Polymer Electrolyte-Based Rechargeable Lithium/Oxygen Battery," J. Electrochem. Soc., 1996, pp. 1-5, vol. 143, No. 1, The Electrochemical Society, Inc., Norwood, U.S.A. (5 pages).

Albertus et al., "Identifying Capacity Limitations in the Li/Oxygen Battery Using Experiments and Modeling," Journal of the Electrochemical Society, 2011, pp. A343-A351, vol. 158, No. 3, The Electrochemical Society, U.S.A. (9 pages).

Amatucci et al., "Flouride based electrode materials for advanced energy storage devices," Journal of Flourine Chemistry, 2007, pp. 243-262, vol. 128, Elsevier B.V., North Brunswick, U.S.A. (20 pages).

Beattie et al., "High capacity lithium-air cathodes," Thesis, British Columbia, Canada (13 pages).

Bruce, "Solid-state chemistry of lithium power sources," Chemical Communications, 1997, pp. 1817-1824, School of Chemistry, Fife, UK (8 pages).

Cai et al., "Novel Nanocomposite Materials for Advanced Li-Ion Rechargeable Batteries," Materials, 2009, pp. 1205-1238, vol. 2, Department of Mechanical Engineering, Baton Rouge, U.S.A. (34 pages).

Christensen et al., "Effect of Anode Film Resistance on the Charge/Discharge Capacity of a Lithium-Ion Battery", Journal of the Electrochemical Society, 2003, pp. A1416-A1420, vol. 150, No. 11, The Electrochemical Society, Berkeley, U.S.A. (5 pages).

Christensen et al., "Cyclable Lithium and Capacity Loss in Li-Ion Cells", Journal of the Electrochemical Society, 2005, pp. A818-A829, vol. 152, No. 4, Berkeley, U.S.A. (12 pages).

Christensen et al., "Stress generation and fracture in lithium insertion materials," J. Solid State Electrochem., 2006, pp. 293-319, vol. 10, Berkeley, U.S.A. (27 pages).

David et al., "Structure Refinement of the Spinel-Related Phases $Li_2Mn_2O_4$ and $Li_2Mn_2O_4$," Academic Press, Inc., 1987, pp. 316-323, United Kingdom and South Africa (8 pages).

Doeff et al., "Improved layered mixed transition metal oxides for Li-ion batteries," Lawrence Berkeley National Laboratory, Berkeley, U.S.A. (9 pages).

Kumar et al., "A Solid-State, Rechargeable, Long Cycle Life Lithium-Air Battery," Journal of the Electrochemical Society, 2010, pp. A50-A54, vol. 157, No. 1, Dayton, U.S.A. (5 pages).

Larcher et al., "Recent findings and prospects in the field of pure metals as negative electrodes for Li-ion batteries," Journal of Materials Chemistry, 2007, pp. 3759-3772, vol. 17, The Royal Society of Chemistry, France (14 pages).

Nishizawa et al., "Electrochemical in-Situ Conductivity Measurements for Thin Film of $Li_1$-$xMn_2O_4$ Spinel," Chemical Material, 2000, pp. 1367-1371, vol. 12, No. 5, Japan (5 pages).

Ogasawara et al., "Rechargeable $Li_2O_2$ Electrode for Lithium Batteries," Journal of the American Chemical Society, 2006, pp. 1390-1393, vol. 128, No. 4, © The American Chemical Society, Switzerland (4 pages).

Ohzuku et al., "Electrochemistry of Manganese Dioxide in Lithium Nonaqueous Cell," Journal of the Electrochemical Society, Mar. 1990, pp. 769-775, vol. 137, No. 3, © The Electrochemical Society, Japan (7 pages).

Read, "Characterization of the Lithium/Oxygen Organic Electrolyte Battery," Journal of the Electrochemical Society, 2002, pp. A1190-A1195, vol. 149, No. 9, © The Electrochemical Society, USA (6 pages).

Read et al., "Oxygen Transport Properties of Organic Electrolytes and Performance of Lithium/Oxygen Battery," Journal of the Electrochemical Society, 2003, pp. A1351-A1356, vol. 150, No. 10, © The Electrochemical Society, USA (6 pages).

Shi et al., "Enhanced Electrochemical Properties of Surface Modified $LiMn_2O_4$ by Li—Fe Composites for Rechargeable Lithium Ion Batteries," Bulletin of the Korean Chemical Society, 2010, pp. 309-314, vol. 31, No. 2, Korea (6 pages).

Shukla et al., "Materials for next-generation lithium batteries," Current Science, 2008, pp. 314-329, vol. 94, No. 3, India (16 pages).

USABC Goals for Advanced Batteries for EVs (1 page).

Yang et al., "The effect of oxygen pressures on the electrochemical profile of lithium/oxygen battery," Journal of Solid State Electrochemistry, 2010, pp. 109-114, vol. 14, © Springer-Verlag 2009, China (6 pages).

Zheng et al., "Theoretical Energy Density of Li-Air Batteries," Journal of the Electrochemical Society, 2008, pp. A432-A437, vol. 155, No. 6, © The Electrochemical Society, USA (6 pages).

Christensen et al., "A Mathematical Model of Stress Generation and Fracture in Lithium Manganese Oxide", Journal of the Electrochemical Society, 2006, pp. A1019-A1030, vol. 153, No. 6, © The Electrochemical Society, USA (12 pages).

* cited by examiner

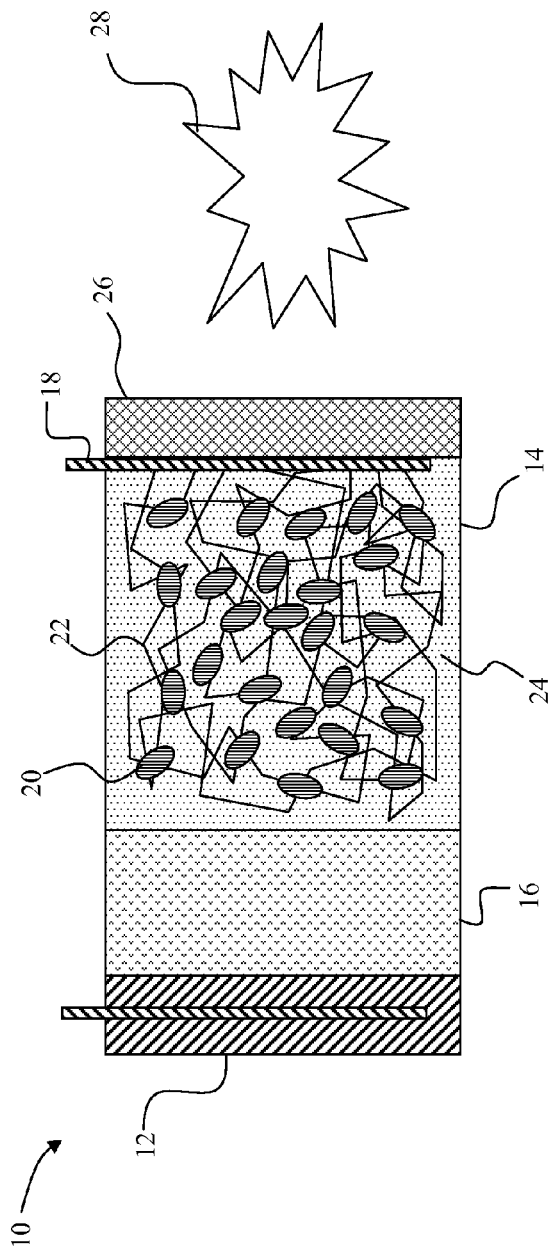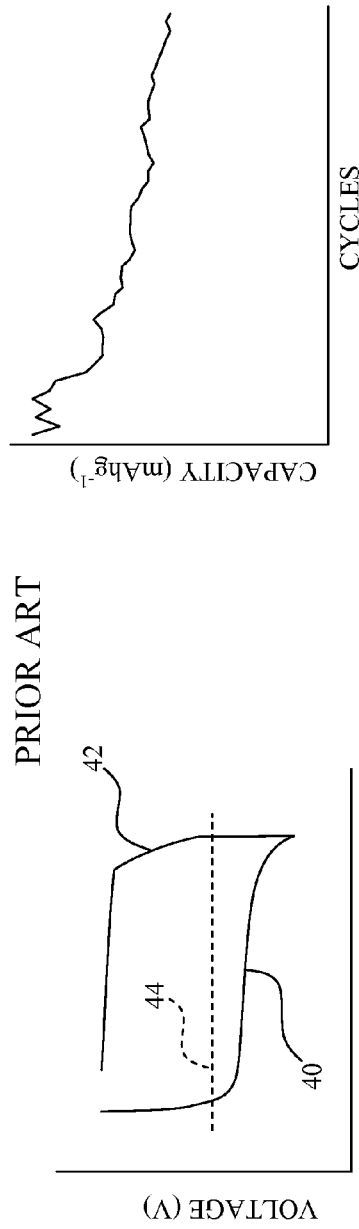
FIG. 1 PRIOR ART
FIG. 2 PRIOR ART
FIG. 3 PRIOR ART

LITHIUM/AIR BATTERY WITH VARIABLE VOLUME INSERTION MATERIAL

TECHNICAL FIELD

This invention relates to batteries and more particularly to lithium (Li) based batteries.

BACKGROUND

A typical Li-ion cell contains a negative electrode, the anode, a positive electrode, the cathode, and a separator region between the negative and positive electrodes. One or both of the electrodes contain active materials that react with lithium reversibly. In some cases the negative electrode may include lithium metal, which can be electrochemically dissolved and deposited reversibly. The separator and positive electrode contain an electrolyte that includes a lithium salt.

Charging a Li-ion cell generally entails a generation of electrons at the positive electrode and consumption of an equal amount of electrons at the negative electrode with the electrons transferred via an external circuit. In the ideal charging of the cell, these electrons are generated at the positive electrode because there is extraction via oxidation of lithium ions from the active material of the positive electrode, and the electrons are consumed at the negative electrode because there is reduction of lithium ions into the active material of the negative electrode. During discharging, the opposite reactions occur.

Li-ion cells with a Li-metal anode may have a higher specific energy (in Wh/kg) and energy density (in Wh/L) compared to batteries with conventional carbonaceous negative electrodes. This high specific energy and energy density makes incorporation of rechargeable Li-ion cells with a Li-metal anode in energy storage systems an attractive option for a wide range of applications including portable electronics and electric and hybrid-electric vehicles.

At the positive electrode of a conventional lithium-ion cell, a lithium-intercalating oxide is typically used. Lithium-intercalating oxides (e.g., $LiCoO_2$, $LiNi_{0.8}Co_{0.15}Al_{0.05}O_2$, $Li_{1.1}Ni_{0.3}CO_{0.3}Mn_{0.3}O_2$) are typically limited to a theoretical capacity of ~280 mAh/g (based on the mass of the lithiated oxide) and a practical capacity of 180 to 250 mAh/g, which is quite low compared to the specific capacity of lithium metal (3863 mAh/g).

Moreover, the low realized capacities of conventional Li-ion cells reduces the effectiveness of incorporating Li-ion cells into vehicular systems. Specifically, a goal for electric vehicles is to attain a range approaching that of present-day vehicles (>300 miles). Obviously, the size of a battery could be increased to provide increased capacity. The practical size of a battery on a vehicle is limited, however, by the associated weight of the battery. Consequently, the Department of Energy (DOE) in the USABC Goals for Advanced Batteries for EVs has set a long-term goal for the maximum weight of an electric vehicle battery pack to be 200 kg (this includes the packaging). Achieving the requisite capacity given the DOE goal requires a specific energy in excess of 600 Wh/kg.

Various materials are known to provide a promise of higher theoretical capacity for Li-based cells. For example, a high theoretical specific capacity of 1168 mAh/g (based on the mass of the lithiated material) is shared by $Li_2S$ and $Li_2O_2$, which can be used as cathode materials. Other high-capacity materials include $BiF_3$ (303 mAh/g, lithiated) and $FeF_3$ (712 mAh/g, lithiated) as reported by Amatucci, G. G. and N. Pereira, "Fluoride based electrode materials for advanced energy storage devices," *Journal of Fluorine Chemistry*, 2007. 128(4): p. 243-262. Unfortunately, all of these materials react with lithium at a lower voltage compared to conventional oxide positive electrodes. Nonetheless, the theoretical specific energies are still very high (>800 Wh/kg, compared to a maximum of ~500 Wh/kg for a cell with lithium negative and conventional oxide positive electrodes).

One Li-based cell that has the potential of providing a driving range above 300 miles incorporates a lithium metal negative electrode and a positive electrode reacting with oxygen obtained from the environment or an onboard $O_2$ storage tank. The weight of this type of system may be reduced if the $O_2$ is not carried onboard the vehicle. Practical embodiments of this lithium-air battery may achieve a practical specific energy of 600 Wh/kg because the theoretical specific energy is 11,430 Wh/kg for Li metal, and 3,460 Wh/kg for $Li_2O_2$.

During discharge of the lithium-air cell, Li ions are stripped from the Li-metal negative electrode, while at the positive electrode, lithium ions ($Li^+$ ions) in the electrolyte react with oxygen and electrons to form a solid discharge product that ideally is lithium peroxide ($Li_2O_2$) or lithium oxide ($Li_2O$), which may coat the conductive matrix of the positive electrode and/or fill the pores of the electrode. In an electrolyte that uses a carbonate solvent the discharge products may include $Li_2CO_3$, Li alkoxides, and Li alkyl carbonates. In non-carbonate solvents such as $CH_3CN$ and dimethyl ether the discharge products are less likely to react with the solvent. The pure crystalline forms of $Li_2O_2$ and $Li_2O$ are electrically insulating, so that electronic conduction through these materials will need to involve vacancies, grains, or dopants, or short conduction pathways obtained through appropriate electrode architectures.

Abraham and Jiang published one of the earliest papers on the "lithium-air" system. See Abraham, K. M. and Z. Jiang, "A polymer electrolyte-based rechargeable lithium/oxygen battery"; *Journal of the Electrochemical Society*, 1996. 143(1): p. 1-5. Abraham and Jiang used an organic electrolyte and a positive electrode with an electrically conductive carbon matrix containing a catalyst to aid with the reduction and oxidation reactions. Previous lithium-air systems using an aqueous electrolyte have also been considered, but without protection of the Li metal anode, rapid hydrogen evolution occurs. See Zheng, J., et al., "Theoretical Energy Density of Li-Air Batteries"; *Journal of the Electrochemical Society*, 2008. 155: p. A432.

An electrochemical cell 10 is depicted in FIG. 1. The cell 10 includes a negative electrode 12, a positive electrode 14, a porous separator 16, and a current collector 18. The negative electrode 12 is typically metallic lithium. The positive electrode 14 includes carbon particles such as particles 20 possibly coated in a catalyst material (such as Au or Pt) and suspended in a porous, electrically conductive matrix 22. An electrolyte solution 24 containing a salt such at $LiPF_6$ dissolved in an organic solvent such as dimethyl ether or $CH_3CN$ permeates both the porous separator 16 and the positive electrode 14. The $LiPF_6$ provides the electrolyte with an adequate conductivity which reduces the internal electrical resistance of the cell 10 to allow a high power.

The positive electrode 12 is enclosed by a barrier 26. The barrier 26 in FIG. 1 is formed from an aluminum mesh configured to allow oxygen from an external source 28 to enter the positive electrode 14. The wetting properties of the positive electrode 14 prevent the electrolyte 24 from leaking out of the positive electrode 14. Oxygen from the external source 28 enters the positive electrode 14 through the barrier 26 while the cell 10 discharges, and oxygen exits the positive electrode 14 through the barrier 26 as the cell 10 is charged. In operation, as the cell 10 discharges, oxygen and lithium ions combine to form a discharge product such as $Li_2O_2$ or $Li_2O$.

A number of investigations into the problems associated with Li-air batteries have been conducted as reported, for example, by Beattie, S., D. Manolescu, and S. Blair, "High-Capacity Lithium-Air Cathodes," *Journal of the Electrochemical Society,* 2009. 156: p. A44, Kumar, B., et al., "A Solid-State, Rechargeable, Long Cycle Life Lithium-Air Battery," *Journal of the Electrochemical Society,* 2010. 157: p. A50, Read, J., "Characterization of the lithium/oxygen organic electrolyte battery," *Journal of the Electrochemical Society,* 2002. 149: p. A1190, Read, J., et al., "Oxygen transport properties of organic electrolytes and performance of lithium/oxygen battery," *Journal of the Electrochemical Society,* 2003. 150: p. A1351, Yang, X and Y. Xia, "The effect of oxygen pressures on the electrochemical profile of lithium/oxygen battery," *Journal of Solid State Electrochemistry: p.* 1-6, and Ogasawara, T., et al., "Rechargeable $Li_2O_2$ Electrode for Lithium Batteries," *Journal of the American Chemical Society,* 2006. 128(4): p. 1390-1393. Nonetheless, several challenges remain to be addressed for lithium-air batteries. These challenges include limiting dendrite formation at the lithium metal surface, protecting the lithium metal (and possibly other materials) from moisture and other potentially harmful components of air, designing a system that achieves acceptable specific energy and specific power levels, reducing the hysteresis between the charge and discharge voltages (which limits the round-trip energy efficiency), and improving the number of cycles over which the system can be cycled reversibly.

The limit of round trip efficiency occurs due to an apparent voltage hysteresis as depicted in FIG. 2. In FIG. 2, the discharge voltage 40 (approximately 2.5 to 3 V vs. $Li/Li^+$) is much lower than the charge voltage 42 (approximately 4 to 4.5 V vs. $Li/Li^+$). The equilibrium voltage 44 (or open-circuit potential) of the lithium/air system is approximately 3 V. Hence, the voltage hysteresis is not only large, but also very asymmetric.

The large over-potential during charge may be due to a number of causes. For example, reaction between the $Li_2O_2$ and the conducting matrix 22 may form an insulating film between the two materials. Additionally, there may be poor contact between the solid discharge products $Li_2O_2$ or $Li_2O$ and the electronically conducting matrix 22 of the positive electrode 14. Poor contact may result from oxidation of the discharge product directly adjacent to the conducting matrix 22 during charge, leaving a gap between the solid discharge product and the matrix 22.

Another mechanism resulting in poor contact between the solid discharge product and the matrix 22 is complete disconnection of the solid discharge product from the conducting matrix 22. Complete disconnection of the solid discharge product from the conducting matrix 22 may result from fracturing, flaking, or movement of solid discharge product particles due to mechanical stresses that are generated during charge/discharge of the cell. Complete disconnection may contribute to the capacity decay observed for most lithium/air cells. By way of example, FIG. 3 depicts the discharge capacity of a typical Li/air cell over a period of charge/discharge cycles.

There is additional evidence that the electronically insulating discharge products in lithium/air cells result in passivation of the electronically conducting substrate of the positive electrode, thereby severely limiting the discharge capacity far below what is required to approach the desired and theoretically achievable specific energy of Li/air cells as reported by Albertus et al., "Identifying Capacity Limitations in the Li/Oxygen Battery Using Experiments and Modeling," *Journal of the Electrochemical Society,* 158, A343 (2011).

What is needed therefore is an energy storage system that can overcome limitations resulting from generation of an insulating $LiO_2$ or $Li_2O_2$ film during discharging of a cell.

SUMMARY

In accordance with one embodiment, an electrochemical cell includes a negative electrode including a form of lithium, a positive electrode spaced apart from the negative electrode and including an electron conducting matrix and a lithium insertion material which exhibits a volume change when lithium is inserted, a separator positioned between the negative electrode and the positive electrode; and an electrolyte including a salt, wherein $Li_2O_2$ or $Li_2O$ is formed as a discharge product.

In another embodiment, an electrochemical cell includes a negative electrode including a form of lithium, a positive electrode spaced apart from the negative electrode and including an electron conducting matrix and a lithium insertion material which exhibits a volume change when lithium is inserted, a separator positioned between the negative electrode and the positive electrode, an electrolyte including a salt, and a form of oxygen in the electrolyte as an active material, wherein $Li_2O_2$ or $Li_2O$ is formed as a discharge product.

BRIEF DESCRIPTION OF DRAWINGS

FIG. 1 depicts a schematic view of a prior art lithium-ion cell including two electrodes and an electrolyte;

FIG. 2 depicts a discharge and charge curve for a typical Li/air electrochemical cell;

FIG. 3 depicts a plot showing decay of the discharge capacity for a typical Li/air electrochemical cell over a number of cycles;

DETAILED DESCRIPTION

Figure 4:
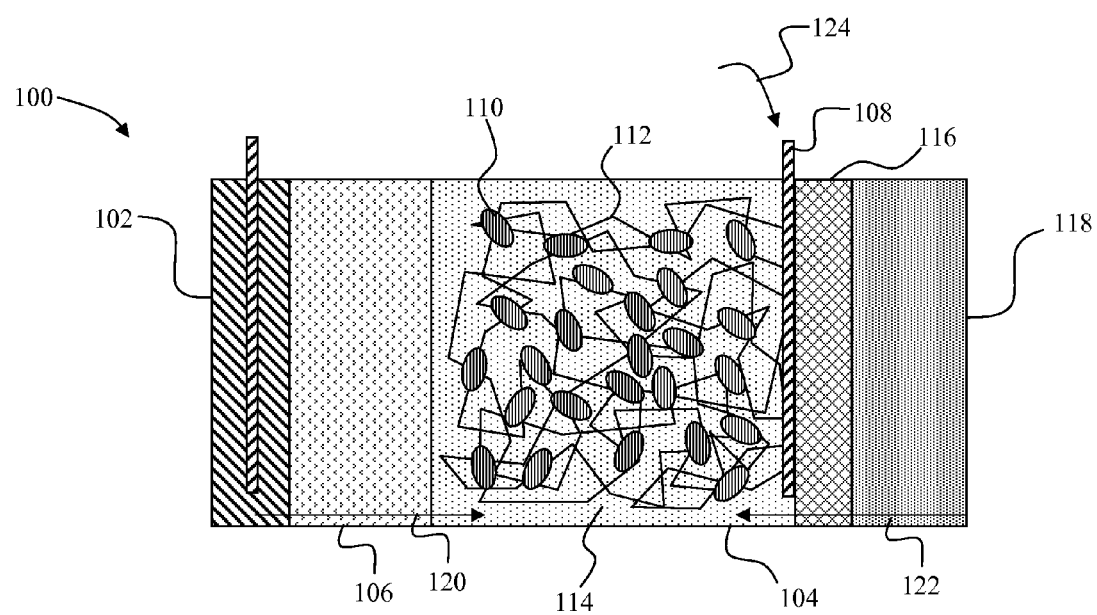
FIG. 4 depicts a schematic view of a lithium-air (Li/air) cell with two electrodes and a reservoir configured to exchange oxygen with a positive electrode, including a lithium insertion material, for a reversible reaction with lithium which includes a concentration of charging redox couples which function as electron shuttles during charging of the Li/air cell.

A schematic of an electrochemical cell 100 is shown in FIG. 4. The electrochemical cell 100 includes a negative electrode 102 separated from a positive electrode 104 by a porous separator 106. The negative electrode 102 may be formed from lithium metal or a lithium-insertion compound (e.g., graphite, silicon, tin, LiAl, LiMg, $Li_4Ti_5O_{12}$), although Li metal affords the highest specific energy on a cell level compared to other candidate negative electrodes.

The positive electrode 104 in this embodiment includes a current collector 108 and lithium insertion material 110, optionally covered in a catalyst material, suspended in a porous matrix 112. The porous matrix 112 is an electrically conductive matrix formed from a conductive material such as conductive carbon or a nickel foam, although various alternative matrix structures and materials may be used. The separator 106 prevents the negative electrode 102 from electrically connecting with the positive electrode 104.

The electrochemical cell 100 includes an electrolyte solution 114 present in the positive electrode 104 and in some embodiments in the separator 106. In the exemplary embodiment of FIG. 4, the electrolyte solution 114 includes a salt, $LiPF_6$ (lithium hexafluorophosphate), dissolved in an organic solvent mixture. The organic solvent mixture may be any desired solvent. In certain embodiments, the solvent may be dimethyl ether (DME), acetonitrile (MeCN), ethylene carbonate, or diethyl carbonate.

A barrier 116 separates the positive electrode 104 from a reservoir 118. The reservoir 118 may be the atmosphere or any vessel suitable to hold oxygen and other gases supplied to and emitted by the positive electrode 104. While the reservoir 118 is shown as an integral member of the electrochemical cell 100 attached to the positive electrode 104, alternate embodiments could employ a flow field, hose, or other conduit to place the reservoir 118 in fluid communication with positive electrode 104. Various embodiments of the reservoir 118 are envisioned, including rigid tanks, inflatable bladders, and the like. In FIG. 4, the barrier 116 is a mesh which permits oxygen and other gases to flow between the positive electrode 104 and the reservoir 118 while also preventing the electrolyte 114 from leaving the positive electrode 104.

The electrochemical cell 100 may discharge with lithium metal in the negative electrode 102 ionizing into a $Li^+$ ion with a free electron $e^-$. $Li^+$ ions travel through the separator 106 in the direction indicated by arrow 120 toward the positive electrode 104. Oxygen is supplied from the reservoir 118 through the barrier 116 as indicated by the arrow 122. Free electrons $e^-$ flow into the positive electrode 104 through the current collector 108 as indicated by arrow 124.

Figure 5:
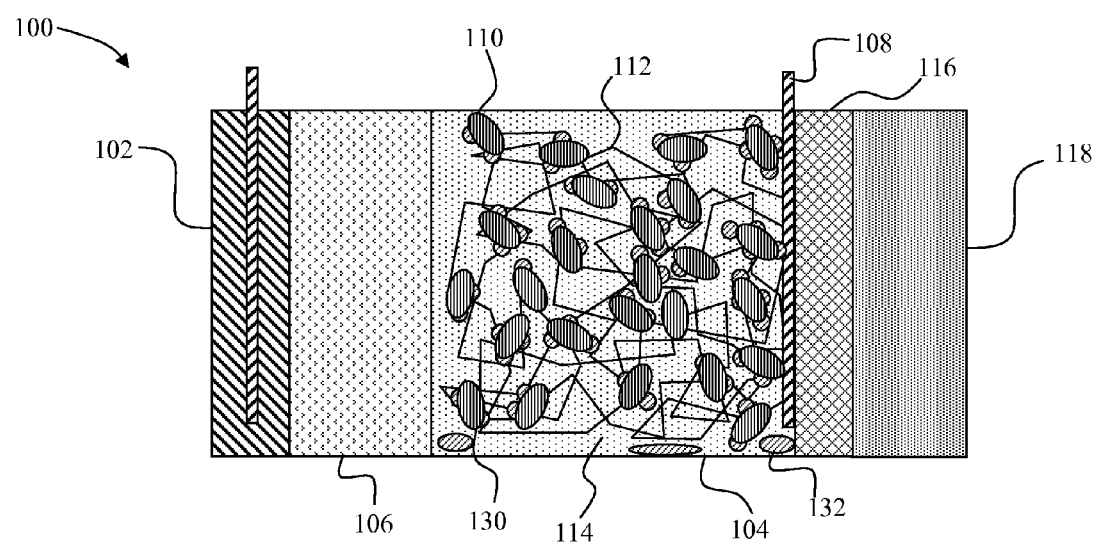
FIG. 5 depicts a schematic view of the Li/air cell of FIG. 4 with discharge products formed on the conductive matrix of the positive electrode and some disconnected discharge product located on the bottom of the positive electrode.

With reference to FIG. 5, the oxygen atoms and $Li^+$ ions within the positive electrode 102 form a discharge product 130 inside the positive electrode 104, aided by the optional catalyst material on the carbon particles 110. As seen in the following equations, during the discharge process metallic lithium is ionized, combining with oxygen and free electrons to form $Li_2O_2$ or $Li_2O$ discharge product that may deposit onto the surfaces of the lithium insertion material 110.

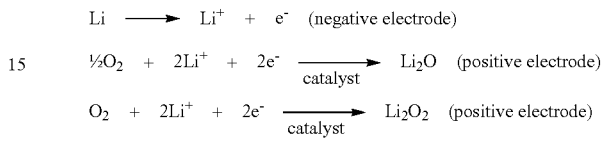

Figure 6:
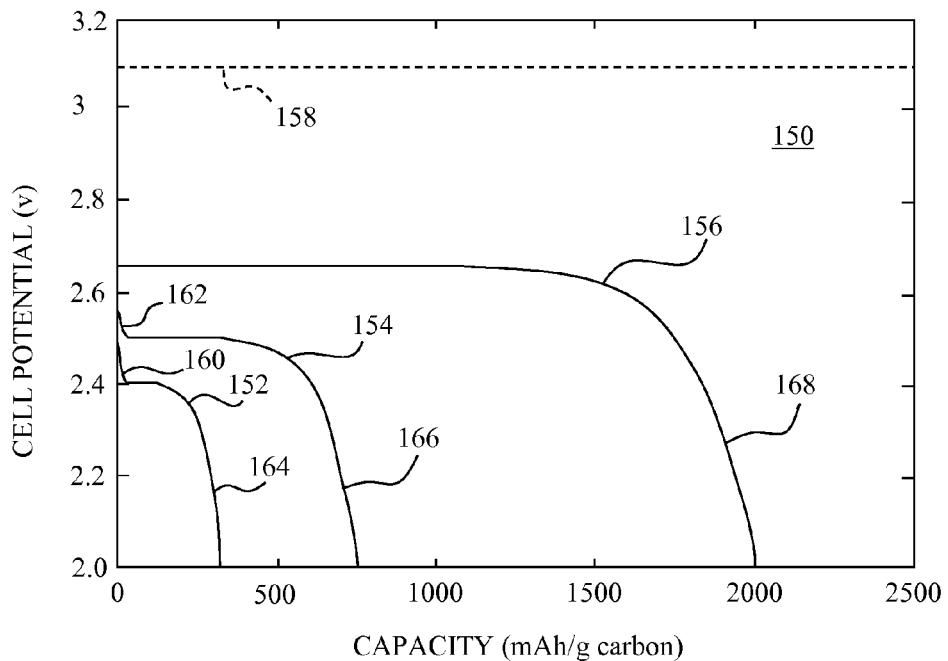
FIG. 6 depicts results of a modeled discharge of a Li/air cell at different discharge rates showing an exponential decrease in voltage commensurate with experimental results which may be due to passivation phenomenon resulting from depositing of $LiO_2$ or $Li_2O_2$ onto the conductive material in the cell.

The $Li_2O_2$ or $Li_2O$ coating in a typical lithium/air cell is thought to significantly reduce the capacity of a typical lithium/air cell. By way of example, FIG. 6 depicts the simulated results 150 of discharging a lithium/air cell at different discharge rates. Line 152 depicts the capacity of the exemplary cell at a discharge rate of 1 mA, line 154 depicts the capacity of the exemplary cell at a discharge rate of 0.5 mA, and line 156 depicts the capacity of the exemplary cell at a discharge rate of 0.1 mA. The cell capacity is significantly below the theoretical capacity of 50 Ah/g-carbon even at the lowest discharge rate.

The results 150 further reveal that while all of the discharge rates are significantly lower than the equilibrium potential 158 of the cell, a rapid initial drop 160 and 162 in cell potential is realized at the higher discharge rates (lines 152 and 154, respectively) and an exponential decrease 164, 166, and 168 in potential is experienced at the end of discharge for all of the discharge rates. The initial difference between cell discharge voltage and equilibrium potential results from a high kinetic resistance. The rapid initial drops 160 and 162 may result from poor kinetics or a mechanism such as oxygen starvation in areas immediately adjacent to conducting surfaces in the positive electrode. The exponential decrease 164, 166, and 168 is thought to result from the $Li_2O_2$ or $Li_2O$ coating.

Figures 7, 8:
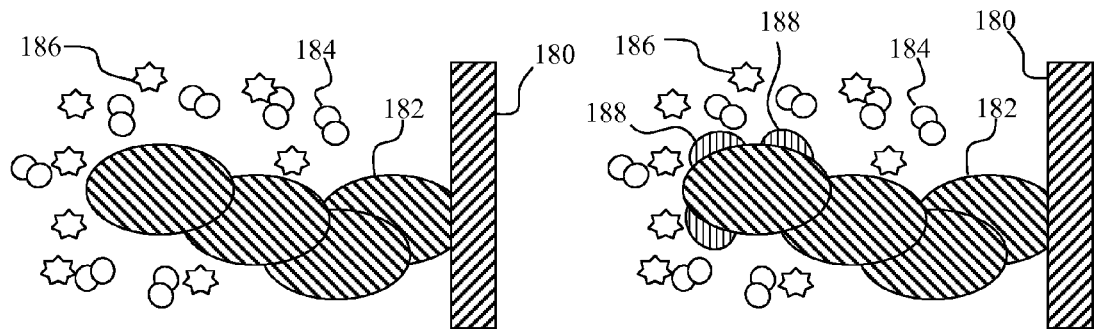
FIG. 7 depicts a partial schematic view of a Li/air cell including a conductive material in a solution including oxygen and a form of Li.
FIG. 8 depicts a partial schematic view of the Li/air cell of FIG. 7 after some amount of $LiO_2$ or $Li_2O_2$ has deposited onto portions of the conductive material.
Figure 9:
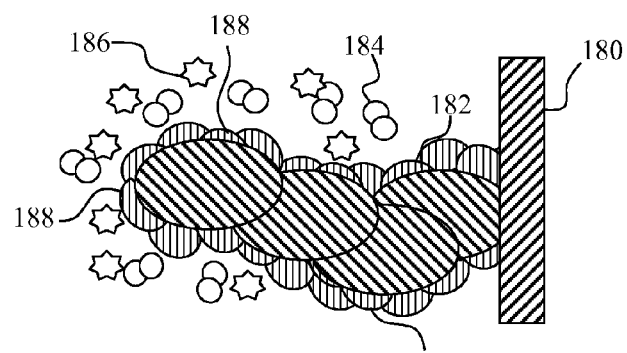
FIG. 9 depicts a partial schematic view of the Li/air cell of FIG. 5 with the conductive material covered with insulating $LiO_2$ or $Li_2O_2$ resulting in a significant inhibition of additional reactions.

Physically, the increased resistance in typical lithium/air cells is described with reference to FIGS. 7-9. In FIG. 7, a collector 180 provides a pathway for electrons to travel to and from an electronic conductor 182. A number of $O_2$ molecules 184 and Li ions 186 are present in solution about the electronic conductor 182. During discharge, electrons (not shown) at the surface of the electronic conductor 182 combine with an $O_2$ molecule 184 and 1 or 2 Li ions 186 to form $LiO_2$ or $Li_2O_2$ 188 which deposits onto the electronic conductor 182 as depicted in FIG. 8. As the discharge continues, sufficient depositing of the $LiO_2$ or $Li_2O_2$ 188 occurs, as depicted in FIG. 9, that further reactions are either precluded or significantly inhibited, resulting in the exponential decreases 164, 166, and 168 of FIG. 6. The model which produced the results 150 indicated the film thickness of the $LiO_2$ or $Li_2O_2$ 188 to be one the order of 10 nm which correlates with experimental results reported by Albertus et al., "Identifying Capacity Limitations in the Li/Oxygen Battery Using Experiments and Modeling," *Journal of the Electrochemical Society*, 158, A343 (2011).

Figure 10:
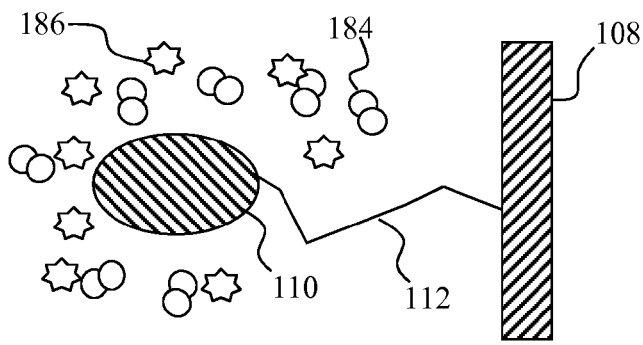
FIG. 10 depicts a partial schematic view of the Li/air cell of FIG. 4 including the lithium insertion material in an electrolyte solution including oxygen and a form of Li.
Figure 11:
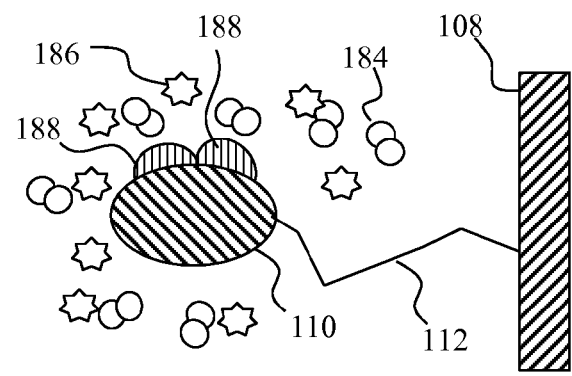
FIG. 11 depicts a partial schematic view of the Li/air cell of FIG. 10 after some amount of $LiO_2$ or $Li_2O_2$ has deposited onto portions of the lithium insertion material but not showing the increase in volume exhibited by the lithium insertion material when lithium is inserted into the lithium insertion material.
Figure 12:
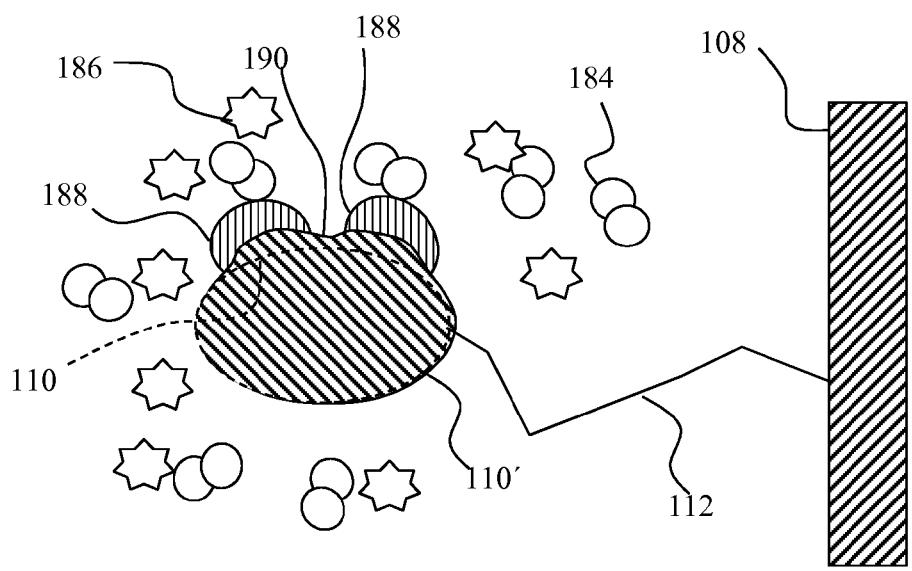
FIG. 12 depicts a partial schematic view of the Li/air cell of FIG. 10 after some amount of $LiO_2$ or $Li_2O_2$ has deposited onto portions of the lithium insertion material and showing the increase in volume exhibited by the lithium insertion material when lithium is inserted into the lithium insertion material so as to create additional surface area on the lithium insertion material for facilitating further reactions.

By incorporation of the lithium insertion material 110, a different dynamic is introduced which is described with reference to FIGS. 10-12. In FIG. 10, a portion of the current collector 108, the porous matrix 112 and the lithium insertion material 110 is depicted. A number of $O_2$ molecules 184 and Li ions 186 from the electrolyte solution 114 are also depicted. During discharge, electrons (not shown) at the surface of the lithium insertion material 110 combine with an $O_2$ molecule 184 and 1 or 2 Li ions 186 to form $LiO_2$ or $Li_2O_2$ 188 which deposits onto the lithium insertion material 110 as depicted in FIG. 11. Upon insertion of $Li^+$ into the lithium insertion material 110, however, the lithium insertion material 110 does not retain its original size as depicted in FIG. 11. Rather, the lithium insertion material 110 swells to the size of the lithium insertion material 110' in FIG. 12. The increased volume of the lithium insertion material 110 results in increased surface area 190 on the lithium insertion material 110. Accordingly, additional electrons are readily exposed to the $O_2$ molecules 184 and Li ions 186 to form additional $LiO_2$ or $Li_2O_2$ 188. A volume change of between 1% and 25% is useful for allowing additional exposure.

In addition to the increased surface area available from the increased volume of the lithium insertion material 110, the adhesion of the $LiO_2$ or $Li_2O_2$ 188 to the surface of the lithium insertion material 110 may be compromised. Accordingly some of the $LiO_2$ or $Li_2O_2$ 188 may flake off of the lithium insertion material 110 thereby exposing more surface area of the lithium insertion material 110. Accordingly, as discharge continues, some of the discharge product 130 may flake off or in some other way become dislodged from the lithium insertion material 110 as indicated by the disconnected discharge product 132 in FIG. 5.

When desired, the electrochemical cell 100 may be charged from the discharged state. Electrochemical cell 100 may be charged by introducing an external electric current which oxidizes the $Li_2O$ and $Li_2O_2$ discharge products into lithium and oxygen. The internal current drives lithium ions toward the negative electrode 102 where the $Li^+$ ions are reduced to metallic lithium, and generates oxygen which diffuses through the barrier 116. The charging process reverses the chemical reactions of the discharge process, as shown in the following equations.

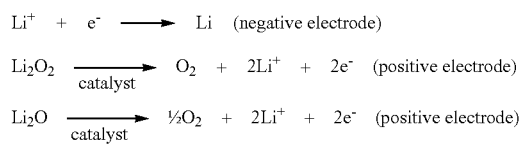

The discharge products 130 in the form of $Li_2O$ and $Li_2O_2$ donate electrons according to the foregoing equations which are transported to the current collector 108 by the electrically conductive matrix 112. This reaction may occur most rapidly with the discharge products 130 immediately adjacent to the particles 110. In cells which do not incorporate a lithium insertion material 110, this may result in a gap that can electrically isolate the discharge products 130 from the electrically conductive matrix 112. Electrical isolation is less likely with the lithium insertion material 110 since conductive grain boundaries in the discharge products 130 are promoted by the changing volume of the lithium insertion material 110.

Regardless of the mechanism by which a disconnected discharge product 132 or poorly connected discharge product 130 is formed, reduction of the disconnected discharge products 132 and the poorly connected discharge products 130 in the electrochemical cell 100 is enabled by the electrolyte solution 114. Specifically, the electrolyte solution 114 includes a charging redox couple which scavenges electrons from the disconnected discharge products 132 and the discharge products 130 and transports the electrons to the electrically conductive matrix 112 whereat the charging redox couple is oxidized as shown in the following equations:

$$Li_2O_2 + 2R \rightarrow O_2 + 2Li^+ + 2R^- \text{ (discharge products)}$$

$$Li_2O + 2R \rightarrow \frac{1}{2}O_2 + 2Li^+ + 2R^- \text{ (discharge products)}$$

$$2R^- \rightarrow 2R + 2e^- \text{ (conductive matrix)}$$

Once the charging redox couple has been oxidized, it is available to transport additional electrons from additional disconnected discharge products 132 and discharge products 130. Nonetheless, to provide optimal performance of the charging redox couple, the selected charging redox couple may exhibit a high solubility in the electrolyte solution 114 to ensure that a sufficient concentration of the charging redox couple is present in the electrolyte solution 114 to function as a rapid redox shuttle between the dislodged discharge product, the discharge products adhered to the lithium insertion material 110, and the electrically conductive matrix 112. When provided as an additive in the electrolyte solution 114, the charging redox couple is typically selected such that the charging redox couple does not react with the electrolyte, binder, separator, negative electrode, or current collectors. In one embodiment, the charging redox couple is a minor constituent of the electrolyte so that it does not adversely affect the transport properties of the electrolyte.

Performance of the electrochemical cell 100 is further optimized by proper selection of the equilibrium voltage of the charging redox couple. For example, the equilibrium voltages for $Li_2O_2$ and $Li_2O$ are, respectively, 2.96 and 2.91 V. Thus, selecting an equilibrium voltage for the charging redox couple that is slightly above 2.96 V, such as between 3 and 3.1 V, limits the over-potential during cell charge.

Exemplary classes of compounds that could be used as a charging redox couple in the electrochemical cell 100 include, but are not limited to, metallocenes (e.g., ferrocene), halogens (e.g., I–/I3–), and aromatic molecules (e.g., tetramethylphenylenediamine). Some specific materials within the foregoing classes which are suitable for use in a Li/air cell with an equilibrium voltage between 2.9 and 4.5 V include Ferrocene which has an equilibrium voltage between 3.05 to 3.38 V, n-Butylferrocene which has an equilibrium voltage between 3.18 to 3.5 V, N,N-Dimethylaminomethylferrocene which has an equilibrium voltage between 3.13 to 3.68 V, 1,1-Dimethylferrocene which has an equilibrium voltage between 3.06 to 3.34 V, 1,2,4-Triazole, sodium salt (NaTAZ) which has an equilibrium voltage of 3.1 V, and Lithium squarate which has an equilibrium voltage of about 3.1 V.

For a given embodiment, the charging redox couple may be selected to provide high reversibility approaching 100% coulombic efficiency. A highly reversible charging redox couple is desirable to allow the charging redox couple to be cycled many times during a single cell charging step. A charging redox couple that exhibits fast kinetics (i.e., its exchange current density is high) is also desirable. Fast kinetics results in a small difference between the charging redox couple's charge and discharge voltage, resulting in more efficient charging.

As described above, the charging redox couple activity is confined to the positive electrode. Therefore, in contrast to overvoltage redox couples, used to provide overvoltage protection, which require high mobility to travel between the positive electrode and the negative electrode, a high mobility is not necessary for a charging redox couple. For example, while movement on the order of 10 s of μm is needed in providing overvoltage protection, the charging redox couples in the electrolyte solution 114 may travel about 1 μm or less.

If desired, a charging redox couple with high mobility may be used to function as a rapid redox shuttle between the disconnected discharge product 132, the discharge products 130, and the electrically conductive matrix 112. Because the high mobility charging redox couple, if unconstrained, may also be reduced at the negative electrode, transport of the oxidized species to the negative electrode may be blocked by applying a protective layer on the negative electrode. The charging redox couple is thus confined to the positive electrode and the separator. One material that may be used as a protective layer is $Li_{1.3}Ti_{1.7}Al_{0.3}(PO_4)_3$, a lithium-ion conducting glass-ceramic material commercially available from Ohara Corporation of Rancho Santa Margarita, Calif.

By incorporation of an optimally selected charging redox couple, the over-potential of the electrochemical cell 100 during charging is lowered. By way of example, for an exemplary electrochemical cell 100 which has discharge products 130 and disconnected discharge products 132 of $Li_2O_2$ or $Li_2O$, the equilibrium voltage of the discharge products 130 and disconnected discharge products is about 2.9 to 3 V. By selecting a charging redox couple (R/R–), wherein species R– is the reduced form of species R) with an equilibrium voltage of 3.1 V, all of the charging redox couple will be in a reduced form (species R–) during discharge, when the cell voltage is below the equilibrium voltage of the discharge product.

During charge of the exemplary electrochemical cell 100, as the potential of the positive electrode with respect to Li/Li+ climbs above 3.1 V, the reduced species R-will be oxidized at the surface of the conducting matrix 112 to form species R. Species R can then react with the discharge product $Li_2O_2$ or $Li_2O$ (chemically or via a corrosion reaction) to form species R–, Li+, and $O_2$, because the discharge product 130 and disconnected discharge product have an equilibrium voltage lower than that of the charging redox couple. The freshly formed species R– can subsequently yield its charge to the conducting matrix 112, while the liberated Li+ can migrate toward the negative electrode 102, where it is deposited as Li metal.

Accordingly, even poorly connected discharge product 130 or disconnected discharge product 132 can be consumed electrochemically during charge at a voltage only slightly above that of the charging redox couple. Assuming a discharge voltage of 2.8 V, reducing the charge voltage from ~4 V to ~3.2 V could yield an improvement in energy efficiency from 70% to more than 87%.

Furthermore, the potential of the lithium insertion reaction into the lithium insertion material 110 is optimally selected to be similar to the potential of the $Li_2O_2$ formation, i.e., between about 2.8 and about 3.2 volts. One candidate for lithium insertion material 110 is $Li_{1+x}Mn_2O_4$ (wherein 0<x<1). $Li_{1+x}Mn_2O_4$ has a voltage plateau around 3 V and undergoes a 5.6 to 6.6% volume change. An advantage of this material is that it has a very flat voltage profile; hence, the full volume change occurs at a constant potential. Doping of the material can be employed to increase or decrease the voltage plateau, as desired.

While the invention has been illustrated and described in detail in the drawings and foregoing description, the same should be considered as illustrative and not restrictive in character. Only the preferred embodiments have been presented and all changes, modifications and further applications that come within the spirit of the invention are desired to be protected.

What is claimed is:

1. An electrochemical cell, comprising:
   a negative electrode including a form of lithium;
   a positive electrode spaced apart from the negative electrode and including an electron conducting matrix and a lithium insertion material which exhibits a volume change when lithium is inserted;
   a separator positioned between the negative electrode and the positive electrode;
   an electrolyte including a salt, wherein $Li_2O_2$ or $Li_2O$ is formed as a discharge product; and
   a charging redox couple having an equilibrium voltage that is within the range, and located within the positive electrode, wherein the electrochemical cell is characterized by the transfer of electrons from the $Li_2O_2$ or $Li_2O$ to the electron conducting matrix using the charging redox couple during a charge cycle, and wherein an electrical potential of a reaction between lithium and the lithium insertion material is approximately equivalent to an electrical potential of a reaction including lithium ions and a form of oxygen in the positive electrode, and wherein the electrical potential of the reaction between lithium and the lithium insertion material is in a range of between about 2.8 volts and 3.2 volts.

2. The electrochemical cell of claim 1 wherein the charging redox couple is at least partially dissolved in the electrolyte.

3. The electrochemical cell of claim 2, wherein the charging redox couple comprises one or more of a metallocene, a halogen, and an aromatic molecule.

4. The electrochemical cell of claim 3, further comprising:
   a protective layer between the negative electrode and the positive electrode configured to block transport of an oxidized species of the charging redox couple to the negative electrode.

5. An electrochemical cell, comprising:
   a negative electrode including a form of lithium;
   a positive electrode spaced apart from the negative electrode and including an electron conducting matrix and a lithium insertion material which exhibits a volume change when lithium is inserted;
   a separator positioned between the negative electrode and the positive electrode;
   an electrolyte including a salt;
   a form of oxygen in the electrolyte as an active material, wherein $Li_2O_2$ or $Li_2O$ is formed as a discharge product; and
   a charging redox couple located within the positive electrode, wherein the electrochemical cell is characterized by the transfer of electrons from the $Li_2O_2$ or $Li_2O$ to the electron conducting matrix using the charging redox couple during a charge cycle, and wherein the lithium insertion material exhibits an increase in volume when lithium is inserted into the lithium insertion material.

6. The electrochemical cell of claim 5, wherein the charging redox couple comprises one or more of a metallocene, a halogen, and an aromatic molecule.

7. The electrochemical cell of claim 6, further comprising:
 a protective layer between the negative electrode and the positive electrode configured to block transport of an oxidized species of the charging redox couple to the negative electrode.

* * * * *